United States Patent [19]

Waldo

[11] 4,161,626

[45] Jul. 17, 1979

[54] TELEPHONE TIME RECORDER

[76] Inventor: Tim R. Waldo, 6542 Blain, Fremont, Mich. 49412

[21] Appl. No.: 872,012

[22] Filed: Jan. 25, 1978

[51] Int. Cl.² .......................................... H04M 15/18
[52] U.S. Cl. ............................. 179/7.1 R; 179/99 R
[58] Field of Search ............. 179/7.1 R, 7.1 TP, 7 R, 179/2 TC, 1 SW, 158 R, 99, 1 HS; 58/152 T, 145 R, 145 K

[56] References Cited

U.S. PATENT DOCUMENTS

| | | | |
|---|---|---|---|
| 3,150,238 | 9/1964 | Carter | 179/99 |
| 3,283,274 | 11/1966 | De Falco | 179/158 R |
| 3,320,366 | 5/1967 | Plummer | 179/7.1 TP |
| 3,508,392 | 4/1970 | Temps, Jr. | 58/145 K |
| 3,512,355 | 5/1970 | Lang | 179/7.1 R |
| 3,538,258 | 11/1970 | Zuckerman | 179/7.1 R |
| 3,555,193 | 1/1971 | Brand | 179/7.1 R |
| 3,767,862 | 10/1973 | Grushow | 179/7.1 R |
| 3,769,463 | 10/1973 | Graham et al. | 179/7.1 TP |
| 3,962,548 | 6/1976 | Stone, Jr. | 179/7.1 R |
| 4,079,201 | 3/1978 | Scott et al. | 179/2 TC |

*Primary Examiner*—Kathleen H. Claffy
*Assistant Examiner*—Gerald L. Brigance
*Attorney, Agent, or Firm*—John E. Reilly; Timothy J. Martin

[57] ABSTRACT

A method and apparatus is provided wherein the total elapsed time for a series of outgoing calls on a plurality of call lines of a telephone is accumulated for each of those lines by a plurality of clocks and switches operating in a monitoring circuit for the output lines. An operator of the telephone may note the accumulated time on each line so as not to exceed an allotted time as is used in different regions of wide area telephone services (WATS). When the timing apparatus is used with a key telephone, the timers are controlled by individual reed switches, each of which is associated with a respective key switch and activated by a magnet attached to said key switch.

10 Claims, 5 Drawing Figures

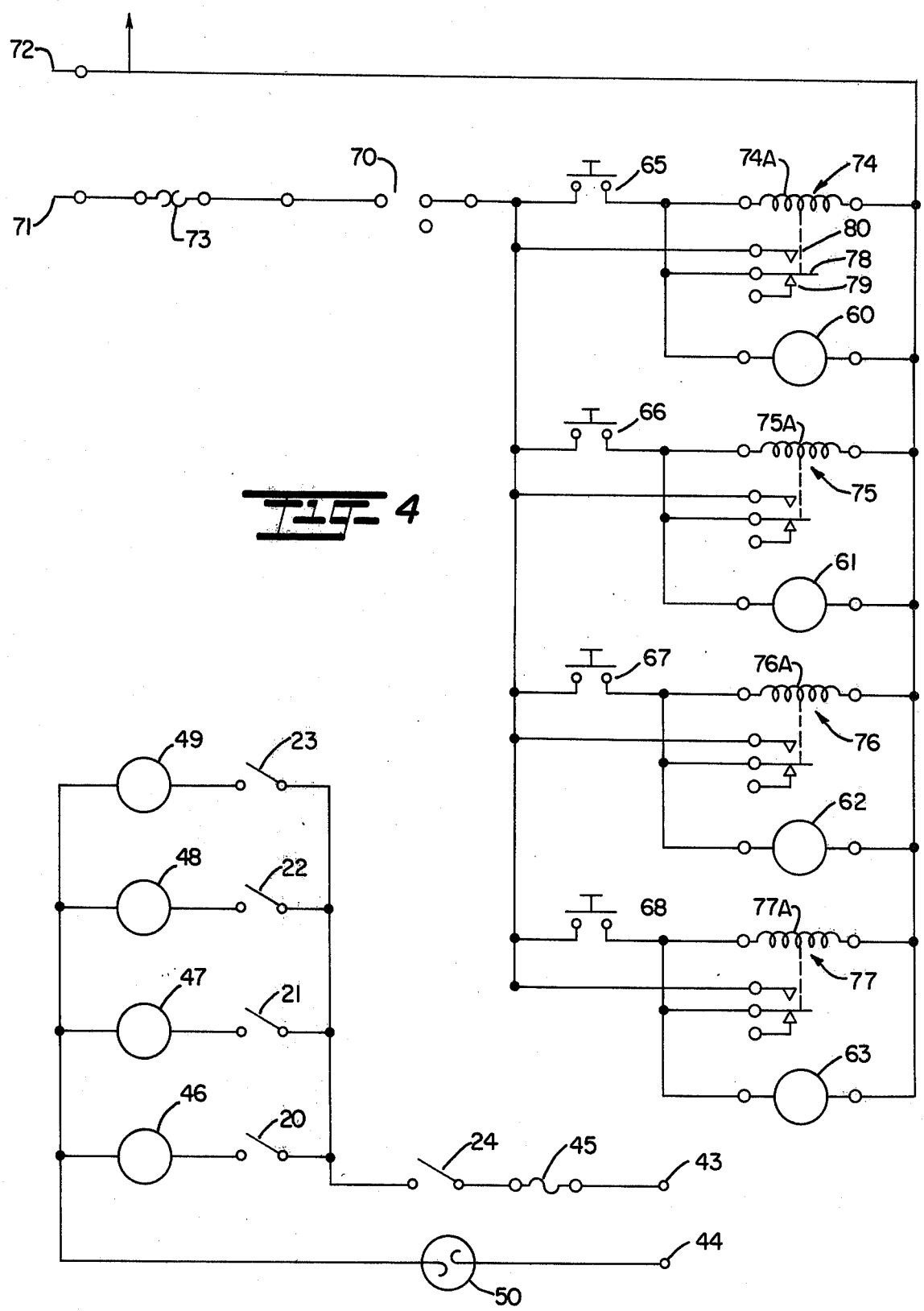

TELEPHONE TIME RECORDER

BACKGROUND OF THE INVENTION

Various attempts in the past have been directed toward the monitoring of telephone calls either to determine the elapsed time or to automatically calculate charges incurred by the telephone call or the number of call units consumed during use of the telephone. An example of such a device is disclosed in U.S. Pat. No. 3,508,392 to Temps wherein two electric switches are mounted adjacent a typical wall-mounted telephone and which control the operation of an electric clock. The clock is started by means of a switch mounted next to the telephone dial so that when the dial is turned the switch actuates a relay thereby starting the clock. Replacement of the telephone receiver in its cradle deactivates the clock by means of a second switch externally connected to the receiver bracket.

Another patent, U.S. Pat. No. 3,769,463 to Graham et al, discloses a system wherein the accumulative cost of a given telephone call is calculated by an electronic claculator after the user programs the device with the necessary rate information.

Similarly, U.S. Pat. No. 3,555,193 to Brand, U.S. Pat. No. 3,962,548 to Stone and U.S. Pat. No. 3,970,793 to Profitt et al disclose devices for timing and charging of long distance telephone calls wherein manual operations either set rate information or start the device with digital rate information being calculated by the machine upon termination of the telephone call. This digital information is provided by a series of discs, and in the case of the Profitt et al disclosure, a digital timer is provided.

Generally, such devices have operated with some degree of success when used with a single line, such as in the Temps patent, or when the proper cost data is manually inserted into the device or provided by the operator. However, there is a need for a system which is capable of accumulating elapsed time of use for each of a given plurality of telephone access lines, such as for instance in recording the usage of WATS lines into different regions or geographical areas.

SUMMARY OF THE INVENTION

It is an object of the present invention to provide a telephone call monitoring method and apparatus which accumulates the total elapsed time of usage of a selected call line of a telephone in a novel and improved manner.

It is a further object of this invention to provide a monitoring circuit capable of monitoring the accumulated usage over each of a plurality of call lines connected to a single telephone in such manner that only outgoing calls are measured for each of the lines.

Another object of the present invention is to provide a telephone call monitoring device wherein the measurement of elapsed time for calls placed to different regions is accumulated for each region and in such manner that termination of measurement of the duration of the call is accomplished automatically while avoiding unintended measurement of the telephone call.

A still further object of the present invention is to provide a telephone call monitoring system wherein the duration of elapsed time of a telephone call is measured automatically on selection by the user of a timer for a specified region, activation of same after a predetermined time delay and in response to operation of the line selection switch already provided on the telephone.

The above objects are provided while eliminating the above and other limitations in the devices previously described by means of the present invention in which a control circuit is operative to monitor telephone calls placed on any number of the telephone call lines connected to a telephone. The lines which have been selected to be monitored by the device may be connected to the monitoring control circuit so that the selection of the line automatically places the control circuit in condition for monitoring that particular line. Alternatively, the user of the telephone operates switches which are indexed to the line so selected. A particularly useful application of the present monitoring circuit is the accumulation of elapsed time for a series of calls into different regions as used in the wide area telephone system (WATS).

The present invention accomplishes this monitoring function preferably by means of a monitoring circuit in which a plurality of starting switches are electrically connected in parallel with each switch being associated with a particular output line of the telephone. A stop switch is connected electrically in series with the starting switches so that the stop switch and one of the set of starting switches must be activated in unison to cause a timer to operate. Since the standard telephone is provided with a disconnect switch which gives the user of the telephone access to the telephone system network, the operation of the stop switch may be automatic if linked either mechanically or electrically to the operation of the disconnect switch. The ensemble of starting switches are connected within the monitoring circuit in series with the stop switch and in parallel to one another to prevent accidental activation of the monitoring circuit and the timing device therein as well as to avoid timing the duration of incoming telephone calls.

After a predetermined time delay, also provided by the monitoring circuit, each starting switch operates a timing device which continually registers the accumulated time of usage of calls placed over a given cell or output line. Each of these starting switches is referenced to a particular output line and a separate accumulator is connected in series with its respective starting switch so that a separate accumulation occurs for the usage of the selected line when both its associated start switch and the stop switch place the monitoring circuit in an energized or activated state. These start switches may either be associated with the line select buttons on the telephone or may be independent of the line select buttons so that the user may manually reference a particular start switch to a particular output line on the telphone.

In operation, the lifting of the receiver of the telephone off its receiving bracket actuates the stop switch so as to place it in a conductive condition for the transmission of an electrical signal in the monitoring circuit and activate the time-accumulating apparatus to measure the duration of the telephone call. However, the timing and subsequent accumulation of the duration of the call only occurs upon actuation, either automatically or by the user, of one of the start switches. At the end of the call, the user replaces the receiver on the telephone and the stop switch is thereby placed in a non-conductive state causing the time accumulator to discontinue timing the telephone call until reactivation of the system. Returning the start switch which, with the stop switch, activated the monitoring circuit to its non-conducting state also discontinues the timing of the call since both it and the stop switch must cooperate to allow the activation and use of the monitoring circuit. When a call is received by the user, the lifting of a receiver actuates only the stop switch so that no accumulation occurs because none of the start switches is activated. In this manner, outgoing telephone calls can be selectively monitored for a series of input/output lines.

As noted above, the invention is especially suited for monitoring WATS calls where a telephone is equipped for access to several geographical regions by means of a plurality of separate WATS lines into that telephone. These WATS lines may either be output telephone call lines or input call lines as used with the "toll-free" calling network of the WATS system. The monitoring device functions as well where both incoming and outgoing calls are made over a common telephone call line or input/output line.

The telephone time recorder functions to monitor WATS calls into different regions by providing a timing device indexed to that region with the indexing accomplished either automatically upon selection of a given telephone call line or manually by selecting a reference or timer start switch for that region. In this manner, the user of the present invention can keep an account of the accumulated time of use of a particular region's line both for a single telephone and for several telephones connected to common WATS call lines.

BRIEF DESCRIPTION OF THE DRAWINGS

FIG. 3 is the preferred electrical circuit diagram used with the first embodiment of the present invention;

FIG. 4 is an electrical circuit diagram used with the second embodiment of the present invention.

DETAILED DESCRIPTION OF THE PREFERRED EMBODIMENT

Figure 1:
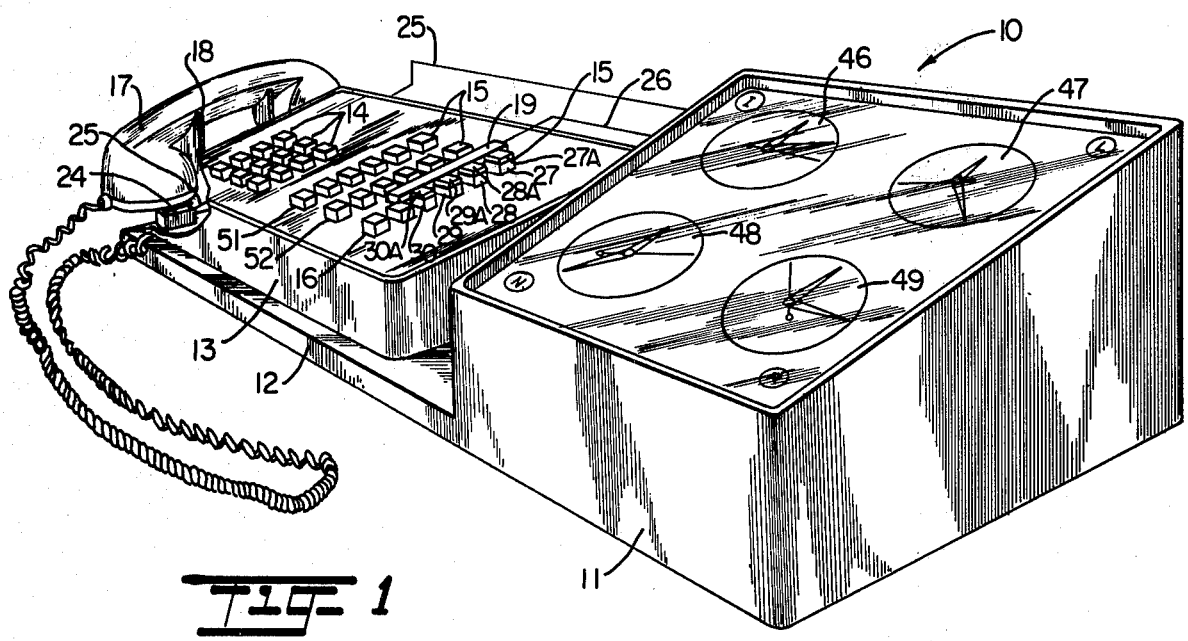
FIG. 1 is a perspective view of the present invention shown with a push button telephone partially broken away in section.

A preferred embodiment of the present invention is adapted to be used with a standard telephone having a series of push button switches each of which is operative to select a given telephone call line connected to the telephone. In this respect, it is noted that a telephone may have different combinations of telephone call lines, such as, to operate only to transmit an outgoing call, or to receive an incoming call, or to function for both outgoing and incoming telephone calls. For this reason, the general term "telephone call line" may hereinafter refer to an output line which transmits a call, an input line which allows receipt of a call, or for an input/output line which both transmits and receives telephone calls. As shown in FIG. 1, the telephone call monitoring device generally designated 10 has a housing 11 including a lateral extension portion 12 which forms a base support for telephone 13. Housing 11 also mounts a plurality of clocks, 46, 47, 48 and 49 which operate as timing mechanisms for the measurement of the duration of a telephone call.

Telephone 13 has a series of dialing buttons 14 of conventional type sometimes designated as "touch tone" which allow dialing of a telephone number. A circular dial is sometimes substituted for these dialing buttons on conventional telephones, and it is understood that the conventional features of a telephone form no part of this invention apart from their interrelationship with the elements of the invention.

An array of line-select buttons 15 is provided on the conventional telephone to allow selection of a particular one of a series of telephone call lines and in this preferred embodiment are selectively actuable to give access to an output line for outgoing calls over the WATS system. In particular, the preferred embodiment contemplates utilization of button column 16 formed by a column of line-select buttons 15. Column 16, then, is used only for long distance WATS calls which are to be monitored by monitoring device 10.

Telephone 13 has a receiver 17 which is mounted on retainer bracket 18 when not in use. Retainer bracket 18 is connected to a disconnect switch, not shown, which is located inside telephone 13. This disconnect switch is standard on all telephones and operates to allow the user of the telephone to dial an outgoing call or receive an incoming call when receiver 17 is removed from bracket 18. More specifically, the disconnect switch controls access to the telephone line network and operates on the telephone call lines of the telephone to allow receipt and transmission of the communicative signals between telephones.

Figure 1A:
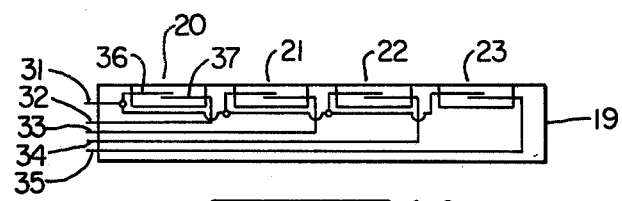
FIG. 1A is a schematical representation of a reed switch module used in one preferred embodiment of the present invention.

As seen from a consideration of FIGS. 1 and 1A, a module 19 contains a plurality of reed switches, 20, 21, 22 and 23. A stop switch 24 is located adjacent to bracket 18 so that when the bracket 18 is depressed by the weight of the receiver 17, stop switch 21 is open or in a nonconductive state. When the receiver 17 is lifted from bracket 18, and bracket 18 moves upwardly to operate the disconnect switch located in the telephone, stop switch 24 closes the circuit through electrical cable 25 so as to energize the monitoring circuit in the manner described below. Stop switch 24 may be closed either by movement of bracket 18, as shown, or by removal of the receiver. This depends on the placement of the stop switch so that it will interact with either the receiver's position or the bracket position. Furthermore, it is to be understood that this stop switch could be located within the telephone so that it operates in conjunction with the disconnect switch and is closed when the disconnect switch is closed and open when the disconnect switch is open. This relationship may be established either mechanically or electrically as is known in the art of electronic switching.

Likewise to cable 25, electrical cable 26 couples the monitoring circuit and module 19 with cable 26 having a plurality of smaller, internal wires 31, 32, 33, 34 and 35 in FIG. 1A, which exceed the number of switches in module 19 by one.

Module 19 is mounted on telephone 13 adjacent to button column 16 of the line-select buttons 15. The top four line-select buttons in bottom column 16 are designated 27, 28, 29 and 30, respectively, but operate in the same manner as all time-select buttons 15, i.e., in selectively coupling an output line with the receiver circuit. Small magnets 27A, 28A, 29A and 30A are mounted on each of buttons 27–30 at an upper portion thereof so that the magnet may interact with reed switches 20–23 in the manner described below. These magnets 27A–30A may also be placed within buttons 27–30.

As best seen in FIG. 1A, module 19 contains reed switches 20–23 and wires 31–35 which are carried by cable 26 and enter at one end of module 19. As noted above, the number of wires 31–35 exceeds the number of reed switches by one since wire 31 forms a ground wire for all of reed switches 20–23 rather than having a distinct ground wire for each switch.

The construction of each of reed switches 20–23 is the same so that a description of one of them will apply to the others. For example, then, reed switch 20 has a pair of normally open reed or closure elements 36 and 37 so that the electrical circuit between wires 32 and 31 is in an open or nonconducting condition. Hence, there are two electrical states for each reed switch, one electrical state being open or nonconductive and the other being closed or conductive. When module 19 is placed alongside buttons 27–30 so that reed switch 20 is adjacent button 27, the polarity of the magnet is such that the reed switch 20 is open. However, when button 27 is depressed, magnet 27A causes elements 36 and 37 to be drawn together so as to effect electrical contact thereby closing the circuit between wires 31 and 32. Elements 36 and 37 remain in contact until button 27 is released from its depressed state so that the magnet no longer retains the reed elements in contact. It is to be understood that this type of operation of reed switches is well known in the art, but that the use of a plurality of reed switches connected in parallel in conjunction with the buttons of a telephone and a monitoring circuit in the manner described is believed to be novel.

Stop switch 24 and module 19 are connected to an electrical circuit shown in FIG. 3. An electrical potential is supplied across contacts 43 and 44 and a fuse 45 is provided to protect the circuit. This circuit has four clocks which are connected electrically in parallel with clock 46 being in series with switch 20, clock 47 being in series with switch 21, clock 48 being connected in series with switch 22 and clock 49 connected in series with switch 23. Clocks 46–49 also are connected electrically in series with stop switch 24. A time delay switch 50 is connected in series with clocks 46–49 and may be selected to provide time delay that is desired, such as 5 seconds so as to approximate the time required for a dialing operation.

In the operation of this embodiment of the invention, it may readily be seen that clocks 46–49 will only operate when both switch 24 and a clock's respective switch 20–23 is closed and then only after time delay switch 50 is placed in a conductive state. Relating this to the mechanical structure of the device, first when a telephone call is received or input to the telephone, the user depresses one of buttons 15 in button columns 51 or 52 and lifts receiver 17 from its bracket 18. This operation causes switch 24 to be placed in a conductive state but clocks 46–49 are not activated since switches 20–23 are open. These switches 20–23 are open because none of buttons 27–30 is depressed. Therefore, a call received by the telephone does not activate the timing mechanisms.

On the other hand, an outgoing call requires the user of the telephone to depress a button in button columns 16, 51 or 52 as well as to lift the receiver 17 from bracket 18. In this manner, the timing mechanism only operates when both the receiver is lifted and one of buttons 27–30 is depressed so as to actuate the respective reed switch 20–23. When both switch 24 and one of switches 20–23 are closed, the timing device will function to measure the duration of elapsed time of the telephone call and after the passage of a selected interval of time dependent upon the time delay component selected in the circuit, the time delay switch 50 is closed to complete the electrical circuit. However, if a switch in button columns 51 and 52 is depressed instead of one of buttons 27–30, then the circuit is not activated since reed switches 20–23 are open or non-conductive. This allows use of other output lines without monitoring, such as local lines, while reserving the monitoring ability for other lines, such as those connected to the WATS network.

Once one of clocks 46–49 begins to time the interval of the telephone call, the time will be continuously accumulated either until the receiver is replaced upon bracket 18 so as to cause switch 24 to open or until the respective button 27–30 is released from its depressed state so as to open a respective switch 20–23. The releasing of buttons 27–30 is accomplished by the conventional mechanical apparatus within the telephone so that such a release occurs automatically upon replacing the receiver 17 on bracket 18 or upon depressing another button in button columns 16, 51 or 52.

In the above, the order in which the switches are placed in a conductive state may be reversed so that either a button may first be depressed and then the receiver lifted from the bracket or the receiver may be lifted from the bracket prior to depressing one of the buttons. In this regard, the time delay switch 50 performs two functions: First, should the user of the telephone inadvertently press one of buttons 27–30, time delay switch 50 provides an interval prior to actuation of the timing mechanism in which the user may correct the error; and second, upon actuation of switches 24 and one of switches 20–23, time delay switch 50 provides an interval for the user to complete dialing of the desired telephone call either by dialing buttons 14 or other dialing mechanism provided by the telephone. For this reason, the duration of time delay provided by time delay switch 50 should be selected to correspond approximately to the length of the dialing operation.

In the above manner, the first preferred embodiment of this invention provides a quite accurate measurement of use of a particular output line which is controlled by buttons 27–30. Clocks 46–49, which are electrically actuable, may then accumulate the elapsed time or usage of its respective output line over a series of telephone calls made on that output line.

Figure 2:
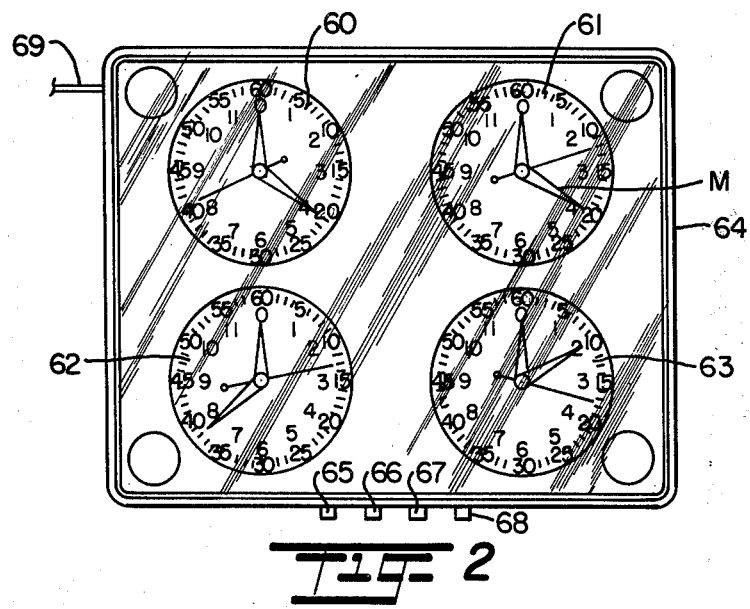
FIG. 2 is a top plan view of an alternate embodiment of the present invention.

An alternate embodiment of the invention is shown in FIG. 2 with its corresponding electrical circuit shown in FIG. 4. This second embodiment also provides a quite accurate accumulation of time use for a given output line while eliminating the necessity of the reed switch and magnets of the first embodiment.

As may be seen in FIG. 2, a plurality of clocks 60–63 are mounted in housing 64 in much the same manner as clocks 46, 47, 48 and 49 are mounted in housing 11 shown in FIG. 1. Clocks 60–63 provide the time accumulation mechanisms of the second embodiment in which a plurality of start switches 65–68 are provided to operate a respective clock 60–63. Cable 69 is electrically connected to a stop switch in much the same manner as that shown in FIG. 1 for stop switch 24. For this reason, the operation of the stop switch in the second embodiment is not now described as it has been described for the first embodiment.

Start switches 65–68 are momentary push button switches which are placed briefly in an electrical conductive state when depressed manually and, when released, automatically return to an electrically nonconductive or open state. The electrical operation of this device, then, is shown in FIG. 4 as described below.

In FIG. 4, respective clocks 60-63 and start switches 65-68 are designated in correspondence with FIG. 2, and, while not shown in FIG. 2, stop switch 70 is indicated in the electric circuit shown in FIG. 4. The manner of operation of this circuit is somewhat similar to that shown in FIG. 3; yet is distinct in the operation of momentary start switches 65-68.

An electrical potential is applied across contacts 71 and 72 and the circuit is protected by fuse 73 from electrical overloads. A plurality of electrical relays 74-77 are provided to correspond to a respective start switch and a respective clock. Therefore, clock 60, start switch 65 and relay 74 cooperate with one another to form a timing circuit. The plurality of start switches, relays and clocks which form four such timing circuits, shown in FIG. 4, are electrically connected in parallel so that a description of one such timing circuit will suffice for the remaining three timing circuits.

A representative timing circuit is formed by clock 60 which will time the duration of an outgoing telephone call when the operator manually activates momentary start switch 65. It is noted that once stop switch 70 is closed, activation of start switch 65 causes the occurrence of two events: First, the electrical circuit through clock 60 is completed so that clock 60 begins to time the duration of the telephone call. Also, the activation of start switch 65 energizes relay coil 74A so that an electrical circuit is completed both through clock 60 and through relay arm 78. In more particularity, relay arm 78 is normally biased against contact 79 so as to maintain an open electrical circuit 60. When relay coil 74A is activated upon activation of momentary switch 65, relay arm 78 is drawn into contact with electrical contact 80 so as to complete the circuit through clock 60 by means of arm 78 and contact 80 as well as through relay coil 74A.

Once stop switch 70 and start switch 65 are both placed in an electrically conductive state, it is no longer necessary for start switch 65 to continue conducting since the relay coil 74A remains energized. For this reason, momentary start switch 65 may be released and clock 60 will continue to time the duration of the telephone call until stop switch 70 is placed in a nonconductive state such as by returning the telephone receiver to its bracket. When stop switch 70 is placed in such a nonconductive state, the electrical circuit is broken and relay arm 78 returns to its normally open position against the contact 79 since relay coil 74A is no longer energized so that clock 60 is deactivated until switches 70 and 65 are again activated successively.

In operation the user of the telephone places switch 70 in a conductive state and dials the number to be called. If the user then desires to time the duration of the telephone call for that particular output line, he depresses one of momentary switches 65-68 when the person to whom the call is made responds to the call signal which initiates the telephone call and the cost billing of the same. The user may then release the start switch 65-68 and the respective clock 60-63 will time the duration or interval of that telephone call which is terminated when the user returns the receiver to the bracket so as to open the circuit through the stop switch 70.

It is to be understood that in this manner, a selected one of the clocks 60-63 may accumulate the total time usage for a given respective telephone output line only for those calls originating from the telephone since the user does not depress start switchs 65-68 for an incoming call. It is also be to understood that in both this embodiment and the first embodiment the respective timing clocks may be reset at any time the user desires, such as, at the end of a billing period.

A particular usefulness of this invention is with the wide area telephone system (WATS) which allows a user to call distant regions at a reduced rate and which is charged at a flat, monthly rate for a specified number of hours. Since a surcharge is added for use exceeding the allotted time, it is desirable to monitor total user time each month so as to forewarn the user not to exceed his allotment. This is even more so the case where a user has a plurality of WATS terminals in different regions and must keep track of the allotted time for each region. An additional advantage accrues to the user of the present invention where several telephones located at different points or within different offices are connected to the same WATS line and subject to the same flat rate. Here, an accounting may be conducted periodically during each period and each user's allotment adjusted according to the amount of time remaining.

For example, where several different offices have common WATS lines R, S, T and U which correspond to geographical regions R', S', T' and U', each office terminal may be budgeted a particular fraction of the total WATS time allotment by each region so that the sum of all fractional allotments equals the total allotment of flat rate service for which the user pays for each of lines R, S, T and U. Each fractional allotment may then be indicated on each recorder either by marking the timer cover face with an erasable mark or by providing an indexing means on the timer, shown in FIG. 2 as index hand M, or merely by attaching a chart of allotted use for each line to the telephone and recorder assembly. If, at any time during the monthyl billing period, use of one of the terminals approaches the fractional allotment for any region, the user may visit each terminal to determine the amount of time remaining in the total WATS allotment for that region and an adjustment of budgeted time among offices can be undertaken. In this case, the office which is nearing its budgeted time may receive additional time from other offices with the budgeted time in other offices being correspondingly reduced. As a result, use of the WATS lines on each telephone may be monitored to avoid a surcharge. This is especially useful where a large company budgets its divisions separately and alots to each a specified time share of WATS line use.

Although the present invention has been described in detail relative to the description of the exemplary preferred embodiments, various changes, modifications, additions and applications other than those specifically mentioned herein will be readily apparent to those having normal skill in the art without departing from the spirit of this invention.

What is claimed is:

1. In a telephone having a receiver, a receiver retainer, and a plurality of push buttons connected to a plurality of telephone call lines with a disconnect switch connected to the telephone call lines so as to be responsive to displacement of said receiver from said retainer to transmit a call when closed and to terminate the call when opened, a telephone call monitoring device for measuring the elapsed time of usage of selected ones of said telephone call lines for calls initiating from said telephone comprising a monitoring circuit including a plurality of timers electrically connected in parallel to one another in said monitoring circuit, a stop switch and means electrically connecting said stop switch in series with each of said timers, said stop switch switchable between conductive and non-conductive electrical states, start switch means associated with each said timer including a plurality of start switches mounted in a elongated strip, said strip positioned adjacent a set of said buttons, each said start switch being a reed switch mounted adjacent a respective one of said push buttons and switchable between conductive and non-conductive electrical states, activating members including magnetic means associated with each button of said set and its associated start switch, said activating members operative to switch an associated one of said start switches when its associated button is moved transversely of said strip, each of said timers in said monitoring circuit having an associated said start switch and being energized when its associated start switch and said stop switch are in conductive states and being deenergized when one of its associated start switch and said stop switch is in a non-conductive state, and accumulating means associated wih each of said timers for cumulatively storing and displaying the aggregate time lapse resulting from a series of calls as measured by the time duration that its respective timer is energized.

2. A telephone call monitoring device according to claim 1 wherein said stop switch is mounted to said telephone adjacent said retainer, said stop switch being switchable into said conductive state in response to removal of said receiver from said retainer and into said non-conductive state in response to replacement of said receiver on said retainer.

3. A telephone call monitoring device according to claim 1 wherein said stop switch is mounted internally of said telephone and mechanically linked to said disconnect switch.

4. A telephone call monitoring device according to claim 1 wherein said magnetic means are secured to said buttons and operative to magnetically switch an associated one of said reed switches.

5. A telephone call monitoring device according to claim 1 wherein said monitoring circuit further includes a time delay means for delaying the energization of each of said timers for a predetermined time after said stop switch and a respective one of said start switches are in conductive electrical states.

6. A telephone call monitoring device according to claim 1 wherein said timers are mounted on a common housing and including indexing means associated with said timers and said switches for indicating which timer is responsive to each of said push button switches.

7. A telephone call monitoring device according to claim 6 wherein said housing includes a lateral extension for supporting said telephone adjacent said timers.

8. A telephone call monitoring device for accumulating the elapsed time of usage of a telephone, which telephone has at least one multiple position push button operative to select a desired telephone call line and a disconnect switch terminating a call on said telephone call line comprising:

a reed switch in offset adjacent relation to said button;

a magnet secured to an upper portion of said button, said magnet moveable in a path transverse of said reed switch and operative to place said reed switch in a conductive electrical state when said button is in a first position and to place said reed switch in a non-conductive electrical state when said button is in a second position;

a stop switch switchable between conductive and nonconductive electrical states;

monitoring circuit means for transmitting an electric signal from a signal generator to said stop switch and said reed switch; and a timing device connected to said circuit means for measuring the duration of said call, said timing device being activated when both said stop switch and said reed switch are in said conductive states and being deactivated when one of said stop switch and said reed switch is placed in a non-conductive state.

9. A telephone call monitoring device according to claim 8, wherein said circuit means includes a time delay means for preventing the transmission of said signal for a selected time after both said stop switch and said reed switch are in said conductive states.

10. A telephone call monitoring device according to claim 8, including a plurality of magnets affixed to a corresponding number of buttons arranged in closely spaced relation to one another along a single file, each button electrically connectable to a different telephone call line, and a plurality of reed switches arranged in a common module and connected electrically in parallel, each reed switch disposed adjacent one of said buttons and switchable between conductive and non-conductive electrical states in response to movement of the magnet on an associated button, and a timer electrically connected to each of said reed switches and operative to accumulate the time intervals of telephone calls on the telephone call line associated with each of said reed switches when both said stop switch and one of said reed switches are in said conductive electrical states.

* * * * *

UNITED STATES PATENT OFFICE
CERTIFICATE OF CORRECTION

Patent No. 4,161,626     Dated 17 July, 1979

Inventor(s) Tim R. Waldo

It is certified that error appears in the above-identified patent and that said Letters Patent are hereby corrected as shown below:

IN THE SPECIFICATION:

Column 1, line 23, cancel "claculator" and substitute -- calculator --.
Column 2, line 39, cancel "cell" and substitute -- call --.
Column 2, line 51, cancel "telphone" and substitute -- telephone --.
Column 3, line 49, cancel "the" and substitute -- that --.
Column 4, line 56, cancel "bottom" and substitute -- button --.
Column 8, line 35, cancel "monthyl" and substitute -- monthly --.

IN THE CLAIMS:

Column 9, line 43, cancel "1" and substitute -- 4 --.

Signed and Sealed this

Fifth Day of February 1980

[SEAL]

Attest:

SIDNEY A. DIAMOND

Attesting Officer   Commissioner of Patents and Trademarks